United States Patent [19]

Meunier et al.

[11] Patent Number: 4,849,842
[45] Date of Patent: Jul. 18, 1989

[54] METHOD FOR THE MANUFACTURE OF A MECHANICALLY SHIELDING LAYER FOR A MAGNETIC READ/WRITE HEAD, AND MAGNETIC READ/WRITE HEAD USING THIS METHOD

[75] Inventors: Paul L. Meunier, Paris; Manijeh Razeghi, Orsay; Jean L. Rolland, Paris, all of France

[73] Assignee: Thomson-CSF, Paris, France

[21] Appl. No.: 37,195

[22] Filed: Apr. 10, 1987

[30] Foreign Application Priority Data

Apr. 11, 1986 [FR] France ................. 86 05238

[51] Int. Cl.$^4$ ............................................. G11B 5/255
[52] U.S. Cl. ........................................ 360/122; 29/603; 428/900
[58] Field of Search ................. 428/195, 900; 360/122, 360/125, 126, 127

[56] References Cited

U.S. PATENT DOCUMENTS

| | | | |
|---|---|---|---|
| 3,663,767 | 5/1972 | Shimotori et al. | 360/122 |
| 3,683,126 | 8/1972 | Krause | 360/122 |
| 4,130,847 | 12/1978 | Head et al. | 360/122 |
| 4,504,540 | 3/1985 | Kaminaka et al. | 428/195 |
| 4,589,043 | 5/1986 | Grundter | 360/122 |
| 4,644,431 | 2/1987 | Kishine et al. | 360/122 |
| 4,667,260 | 5/1987 | Perlov et al. | 360/122 |

FOREIGN PATENT DOCUMENTS

| | | | |
|---|---|---|---|
| 53-132322 | 11/1978 | Japan | 360/122 |
| 55-89915 | 7/1980 | Japan | 360/122 |
| 56-19517 | 2/1981 | Japan | 360/122 |
| 58-105421 | 6/1983 | Japan | 360/122 |
| 58-141428 | 8/1983 | Japan | 360/122 |
| 59-129917 | 7/1984 | Japan | 360/122 |
| 62-275308 | 11/1987 | Japan | 360/122 |

OTHER PUBLICATIONS d'Heurle et al., IBM TDM, "Silicon Nitride Protection for Magnetic Heads", vol. 19, No. 1, Jun. 1976, p. 351.
Morrison et al., IBM TDB, "Magnetic Transducer Head", vol. 7, No. 4, Sep. 1964, p. 333.
Patents Abstracts of Japan, vol. 5, No. 150 (P-81) [822], 22 Sep. 1981; & JP A 56 83 829 (Mitsubishi Denki K.K.).
Patents Abstracts of Japan, vol. 1, No. 19, 2 Feb. 1978, p. 11178 E 77; & JP-A-52 137 313 (Suwa Seikosha K.K.).
IBM Technical Disclosure Bulletin, vol. 14, No. 6, Nov. 1971, p. 1756, Armonk, N.Y. U.S.; V. Sadagopan et al.: "Wear Resistant GaFeO3 Coatings".
Patents Abstracts of Japan, vol. 7, No. 270 (P-240) [1415], 2 Dec. 1983; & JP-A-58 150 122 (Nippon Denki K.K.); 6-9-83.
Patents Abstracts of Japan, vol., 10, No. 48 (P-431) [2105], 25 Feb. 1986; & JP-A-60 193 112 (Seiko Denshi Kogyo K.K.) 01-10-1985.
IBM Technical Disclosure Bulletin, vol. 19, No. 1, Jun. 1976, p. 351, Armonk, N.Y., U.S.; F. d'Heurle et al.: "Silicon Nitride Protection for Magnetic Heads".
Patents Abstracts of Japan, vol. 6, No. 183 (P-143) [1061], 18 Sep. 1982; & JP-A-57 98 121 (Hitachi Kinzoku K.K.) 18-06-1982.
Patents Abstracts of Japan, vol. 10, No. 30 (P-426) [2087], 5 Feb. 1986; & JP-A-60 179 905 (Tokyo Denki K.K.), 13-09-1985.
Patents Abstracts of Japan, vol. 9, No. 37 (P-335) [1760], 16 Feb. 1985; & JP-A-59 177 721 (Matsushita Denki Sangyo K.K.) 08-10-84.

*Primary Examiner*—John H. Wolff
*Assistant Examiner*—Matthew J. Bussan
*Attorney, Agent, or Firm*—Oblon, Spivak, McClelland, Maier & Neustadt

[57] ABSTRACT

The invention pertains to a method for the manufacture of a magnetic head, and a magnetic head in which this method is applied, a method which, after the head is manufactured, provides for a stage for making a mechanically shielding layer of a material such that the bonding coefficient is high, i.e. such that the chemical valencies with respect to the material forming the head is close to one.

The invention can be applied in particular, to the manufacture of magnetic heads in thin layers for reading/writing on magnetic tapes.

13 Claims, 1 Drawing Sheet

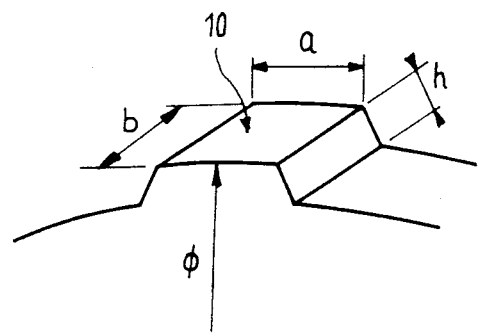
FIG_1 PRIOR ART
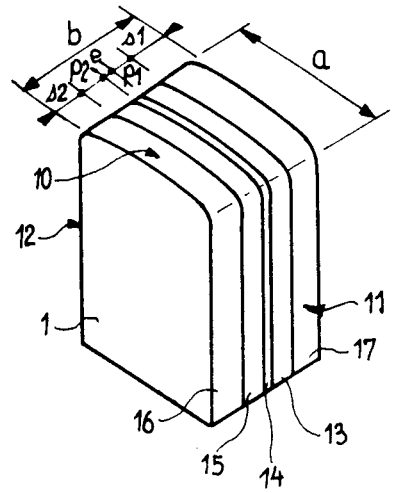
FIG_2 PRIOR ART
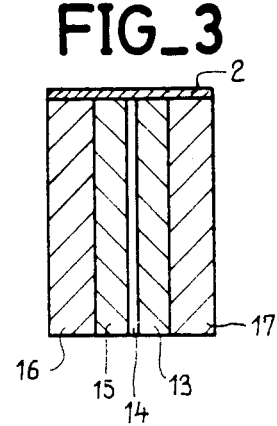
FIG_3
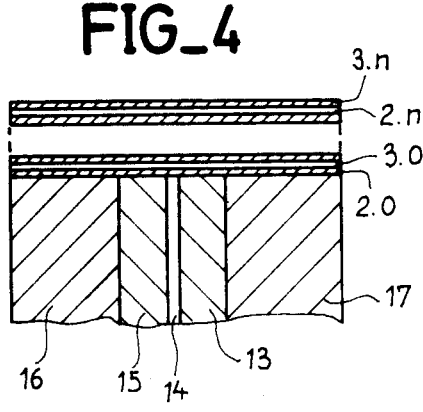
FIG_4
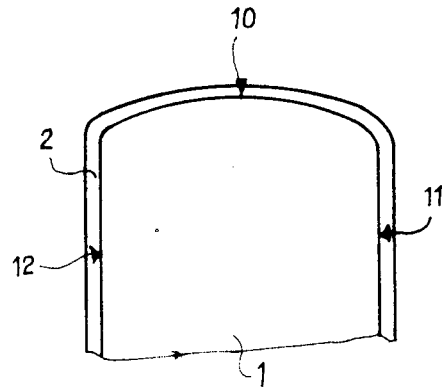
FIG_5

METHOD FOR THE MANUFACTURE OF A MECHANICALLY SHIELDING LAYER FOR A MAGNETIC READ/WRITE HEAD, AND MAGNETIC READ/WRITE HEAD USING THIS METHOD

BACKGROUND OF THE INVENTION

1. Field of the Invention

The invention pertains to a method for the manufacture of a mechanically shielding layer for a magnetic read/write head, and a read/write head in which this method is applied, especially in the technology of integrated magnetic heads.

2. Description of the Prior Art

Integrated magnetic heads are currently produced as reading or writing elements for hard disks. In this use, the magnetic heads float above the surface of the disk. The floating height is a few microns and the heads, when they are being used, never enter into friction against the disk except when the disk is started or stopped.

By contrast, in instruments of the videotape recorder type, the recording medium is a magnetic tape, made either of an oxide or of metal, and the heads are in contact with the tape. This results in a rate of abrasion which, according to present standards for VHS heads, is 20 micrometers for 2000 hours of working, thus setting the lifetime of the videotape recorder.

For thin layer heads, the problem of the interface between the tape and the read/write head is a more crucial one because it relates to dimensions of a few micrometers for active magnetic parts. For the thin layer deposits are about 5 micrometers thick, and the gap is 0.2 micrometer thick while the substrate on which the layers are set are about 500 micrometers thick.

Thus, it is worthwhile to shield the active parts of magnetic heads against premature wearing out.

This is why the invention proposes a method to make a shielding layer on the active surfaces of magnetic heads, the layer obtained being thin enough, and having a uniform thickness so that the quality of the head is not harmed.

SUMMARY OF THE INVENTION

The invention therefore pertains to a method for making a mechanically shielding layer for a magnetic read/write head with an active surface, a method wherein, after the magnetic read/write head is made, there is at least one stage in which a material is deposited on the active surface, the said material comprising one or more chemical elements which have a very high coefficient of bonding with the material or materials that constitute the active surface.

The invention also pertains to a magnetic read/write head in which this method is applied, a magnetic head comprising, on its external surface, at least one thin layer of a mechanically shielding material that has a high coefficient of bonding with the material constituting the head.

BRIEF DESCRIPTION OF THE DRAWINGS

The various objects and characteristics of the invention will be seen more clearly from the following description, made with reference to the appended drawings, of which:

FIG. 1 is a general view of a portion of a magnetic read/write head according to the prior art;

FIG. 2 depicts an example of a simplified embodiment of an integrated magnetic head according to the prior art;

FIG. 3 depicts an example of a simplified embodiment of an integrated magnetic head according to the invention;

FIG. 4 depicts an example of an alternative embodiment of FIG. 3; and

FIG. 5 depicts an alternative embodiment of the magnetic read/write head of the present invention.

DETAILED DESCRIPTION OF THE INVENTION

A reading head according to the prior art, such as the one depicted in FIG. 1, has a diameter of about 10 mm. and has active read/write portions with a thickness h of about 20 micrometers. Each active portion has an active surface with a length a of about 500 micrometers and a width b of about 1000 micrometers.

When the active portion is made in thin layers, it has a configuration such as the one depicted in FIG. 2. It then has two layers of magnetic material, 13 and 15, separated by a layer 14 made of a non-magnetic material.

The layers 13 and 15 are sandwiched by substrate layers 16, 17 made of a material such as hot-pressed or monocrystalline ferrite.

The layers 13 and 15 of magnetic material thus form the pole pieces of the magnetic head and the layer 14 forms the gap between these pole pieces. To prevent the abrasion of the head, the invention proposes to line it with one or more shielding layers 2 which are thin enough to avoid harming its qualities.

According to a first example of the method of the invention, it is proposed, after the magnetic head 1 is finished, to make a layer 2 on the active surface 10 of the magnetic head, this layer 2 being made of a material that has a high coefficient of bonding with the active surface 10, i.e. the valency between the layer 2 and the materials of the active surface 10 approaches 1. The material of the layer 2 further exhibits sound resistance to abrasion and high lubricating capacity.

For example, since the magnetic material 13 and 15 is an alloy of iron, aluminium and silicon, and since the gap 14 is an aluminium oxide $Al_2O_3$, the material of the layer 2 may be an alloy of chemical elements belonging to group IV of the periodic table, such as silicon carbide $S_iC$. But other elements, and in particular, more than 2 elements may be chosen.

When two elements are used, the alloy of the layer 2 will be a monocrystal or, when several elements are chosen, it may a polycrystal, depending on the conditions of growth. The crystalline structure obtained will be oriented and the constituent elements will be well bonded so as to preserve a slight degree of elasticity in the direction of the thickness.

According to the invention, the shielding layer can be made by one of the following methods:

Epitaxial growth in vapor phase also known as "chemical vapor deposition" (CVD);

Epitaxial growth in metalorganic vapor phase, also known as "metalorganic chemical vapor deposition" (MOCVD);

Molecular beam epitaxy or MBE;

Sputtering;

Vapor deposition.

In all these cases, the method used will give a layer 2 which has a uniform thickness that can be adjusted with precision and this method is perfectly reproducible.

If an epitaxy of only one layer of an alloy is made, it will be a layer with a thickness corresponding to the estimated lifetime of the head, for example, a thickness of about a hundred to about a thousand angstroms.

By contrast, one alternative of the invention also provides for the epitaxy of alternate layers of several materials such as those mentioned earlier. For example, as depicted in FIG. 4, when using silicon and carbon, alternate layers of silicon 2.0 to 2.n and carbon 3.0 to 3.n will be grown successively. These layers will have a very small thickness such that all the layers thus obtained thus appear as an alloy of elements of the different layers.

The thickness of each layer will range from a few angstroms to a few tens of angstroms, for example, in a range from 5 angstroms to 40 angstroms.

The number of layers will then depend on the estimated lifetime of the head. For example, it will range from 25 to 150 layers.

The making of these different layers may be considered as a succession of growths of different layers. In fact, they will be made in the course of one and the same growth stage during which the epitaxially grown elements will be periodically changed.

In the example of the embodiment depicted in FIG. 4 there are two types of layers 2.0 to 2.n and 3.0 to 3.n, but it is also possible to provide for a greater number of types of layers by planning the epitaxy of a greater number of elements.

The invention also provides for the injection of other elements such as oxygen or nitrogen, for example, during the entire epitaxy stage or a part of it, both in the example of the method of the invention where the epitaxy of an alloy is made and in the alternative method providing for the epitaxy of alternate layers of different materials.

The above description proposes the lining of the active surface 10 of the head 1, but it is also possible to line the entire head and, especially, the flanks 10 and 12 with which the tape may enter into friction.

The method of the invention can also be used to make several heads on one and the same substrate or to assemble them and then make a shielding layer 2 on all the heads. Thus, a multitrack head is obtained.

The method also provides for making a shielding layer 2 on a group of heads and then separating the different heads from one another.

The method of the invention can thus be used to obtain a magnetic read/write head lined with a thin shielding layer 2 that has a high coefficient of bonding with the material of the head.

The material of the shielding layer exhibits bonding strength in the tearing plane and preserves a slight degree of elasticity in the direction of its thickness. Hence, it is not necessarily hard so as to withstand abrasion, but it ha lubricating capacity.

Furthermore, the method of the invention is reproducible and thus makes it possible to obtain various heads lined with shielding layers of the same thickness and the same qualities giving heads with the same lifetimes.

Finally, to be certain of the lubricating character of the shielding layer, the invention also provides for an additional stage in which a lubricating material such as siloxane polyimide is deposited. A layer of this type may have a thickness of 300 angstroms.

As depicted in FIG. 3, the shielding layer 2 is a single layer and it is made with an alloy of two or more constituent elements. This alloy will be a monocrystal or a polycrystal. The constituent elements may belong, for example, to group IV of the periodic table, and may be elements such as silicon or carbon. It is also possible to use one (or more) elements from the group IV and to inject another product such as oxygen or nitrogen. As mentioned above, the thickness of the layer depends on the estimated lifetime of the head and may be, for example, 100 to 1000 angstroms.

As depicted in FIG. 4, the layer 2 may comprise a stack of sub-layers 2.0 to 3.n. These different sub-layers are made with materials of different types. The example, of FIG. 4 provides for two types of materials and layers 2.0 to 2.n and 3.0 to 3.n of both types of materials are alternated in this example.

Each sub-layer is very thin. For example, its thickness may range from a few angstroms to several tens of angstroms. The number of layers is calculated according to the abrasion factor under friction of the materials used and the estimated lifetime of the head.

For example, this number of layers may range from 25 to 150.

The materials used are the same as those mentioned earlier, for example, silicon and carbon. Other constituents (nitrogen and oxygen for example) may additionally be mixed into these materials.

Again, according to the invention, the magnetic head may have not only its active surface 10 lined with a shielding layer but also as shown in FIG. 5 its flanks 11 and 12, or it may even be entirely lined.

As mentioned earlier in the description of the method of the invention, the layer 2 is made of a monocrystalline or polycrystalline material, the crystalline structure of which is oriented in such a way as to exhibit bonding strength in the tearing plane. The material of the layer 2 further exhibits a slight degree of elasticity in the direction of its thickness; it is not necessarily hard but exhibits lubricating capacity.

Finally, even though this feature is not depicted in the figures, the shielding layer 2 can be lined with a layer of a lubricating material such as siloxane polyimide with a thickness, for example, of 300 angstroms.

The various modes of embodiment of the invention described above are given only by way of example. The numerical values in particular and the types of materials are given only to make the description clearer, but other values and other types of materials may be used without going beyond the scope of the invention.

What is claimed is:

1. Magnetic read/write head having an external surface, comprising:
    at least one thin layer of a mechanically shielding material which has a high coefficient of bonding with the material that forms the head formed on the external surface of said head, said shielding material comprising plural alternate layers of materials of different natures, each of said alternate layers having a thickness ranging from a few angstroms to 40 angstroms.

2. Magnetic read/write head according to the claim 1, wherein the number of said alternate layers ranges from 25 to 150.

3. Magnetic read/write head according to claims 1 or 2, wherein the total thickness of the shielding layer ranges from about a hundred to about a thousand angstroms.

4. Magnetic read/write head according to the claim 1, wherein the shielding material comprises one or more elements belonging to group IV of the periodic table.

5. Magnetic read/write head according to the claim 4, wherein the shielding material comprises silicon and carbon.

6. Magnetic read/write head according to the claim 5, wherein said shielding material comprises alternate layers of silicon and carbon.

7. Magnetic read/write head according to the claim 5, wherein one or more of the elements comprising the shielding material are oxides.

8. Magnetic read/write head accoding to the claim 1, wherein the shielding material comprises an alloy containing nitrogen.

9. Magnetic read/write head according to the claim 1, wherein the shielding material lines an active surface of the head.

10. Magnetic read/write head according to the claim 9, wherein the shielding material lines surfaces of the head adjacent the active surface.

11. Magnetic read/write head according to the claim 1, comprising a layer of lubricating material on the shielding layer.

12. Magnetic read/write head according to,the claim 1, comprising a stack of two layers of substrate which sandwich two layers of magnetic material, acting as pole pieces, which sandwich a layer of non-magnetic material, acting as a gap, the active surface of the head comprising at least edge surface of th is stack of layers.

13. Magnetic read/write head according to claim 1, wherein the shielding material lines an active surfaces of the head adjacent said active surface.

* * * * *